Figure 1:
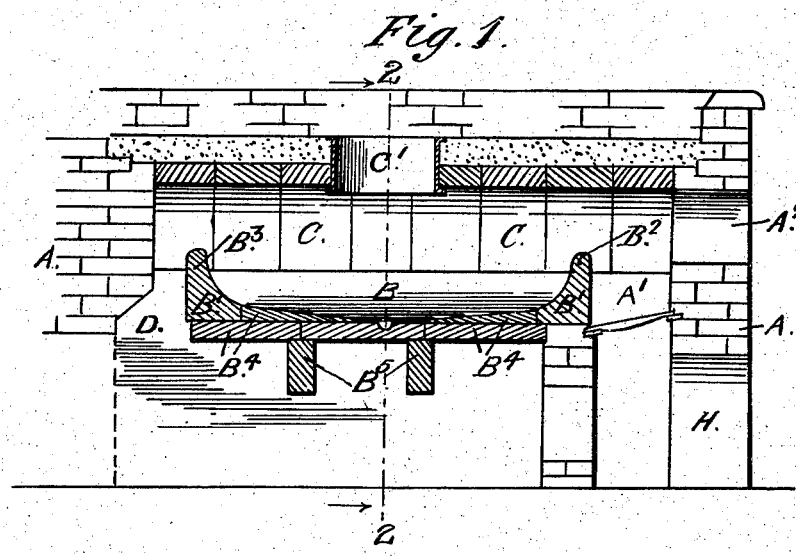

No. 742,018. PATENTED OCT. 20, 1903.
W. W. FYFE.
REDUCING FURNACE.
APPLICATION FILED FEB. 15, 1902.
NO MODEL. 2 SHEETS—SHEET 1.

Witnesses:
Walter A Barlow
H. Howard Barlow

Inventor:
Wm. W. Fyfe

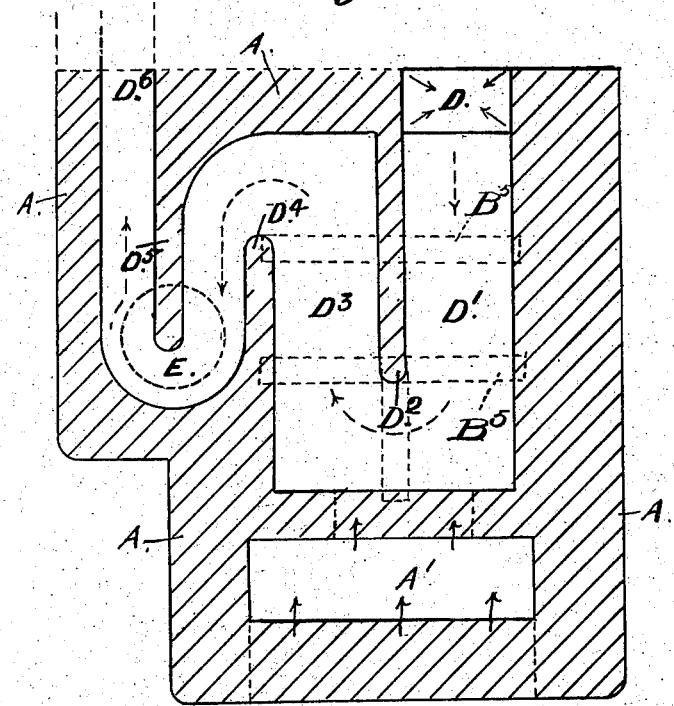

No. 742,018. Patented October 20, 1903.

UNITED STATES PATENT OFFICE.

WILLIAM W. FYFE, OF LONDON, ENGLAND.

REDUCING-FURNACE.

SPECIFICATION forming part of Letters Patent No. 742,018, dated October 20, 1903.

Application filed February 15, 1902. Serial No. 94,561. (No model.)

*To all whom it may concern:*

Be it known that I, WILLIAM WALKER FYFE, engineer, a subject of His Britannic Majesty, and a resident of 13 Stanley Villas, Westberry avenue, Wood Green, London, N., England, have invented certain new and useful Improvements in and in Means for Converting Metallic Oxids into Metal, (for which I have made application for Letters Patent in Great Britain, bearing date the 15th day of July, 1901, No. 14,363,) of which the following is a specification.

This invention relates to certain improvements in and in means for converting metallic oxids into metal, the object being to obtain the metal from the oxids in rapid and comparatively inexpensive manner.

In carrying the invention into practice I provide a furnace of such construction, as hereinafter will be described, as to expose large portions of oxid under treatment to the direct action of the flames and heat, while maintaining and utilizing to the highest degree the temperature of the metal while in its melted condition, this being effected, first, in the furnace hearth or basin in which the oxids are fluxed and roasted and, secondly, in a basin combined with the first, into which secondary pot or basin the metal resultant from the treatment of the oxids is directly passed and further treated before the heated gases are allowed to escape into the chimney of the furnace. The oxids are to be mixed with the necessary fluxes, which are appropriately sodium and potassium carbonates and also carbon in a finely-divided state, the proportions being determined according to the analytic constitution of the oxid that has to be treated. I then subject the mixture of oxid and flux disposed in the hearth or basin of the furnace and spread therein to the heat of the furnace, by which the mixture will be fused, the metal will become molten, and will then run off into the adjacent secondary pot or basin, which same is set into the furnace structure, so that without loss of heat the furnace flame and gases, directed through flues around the said secondary basin or pot, will enable the treatment to be completed in continuous manner without access of air until the converted metal is ready to be poured or run off or is tested. The examination of the molten metal can be effected readily, and if necessary the treatment can be carried further to completion with added carbonates, carbon, and in some cases the addition of iron filings.

In treating of oxids of antimony, tellurian, and other similar volatile elements the conversion to the metallic state may be readily followed, and, for instance, assuming the oxid of antimony to be treated and "glance" and "bloom" are both present the average reaction may be stated as

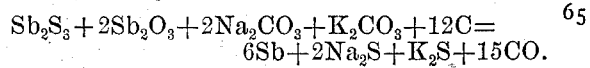
$$Sb_2S_3+2Sb_2O_3+2Na_2CO_3+K_2CO_3+12C=$$
$$6Sb+2Na_2S+K_2S+15CO.$$

Thus the operation from the oxid to the "star antimony" is performed by a single fusion and with superior results.

In order that the invention may be further well ascertained, there are accompanying this application two sheets of drawings showing a construction according to this invention, the same being referred to by letters in the following more particular description.

Figure 2:
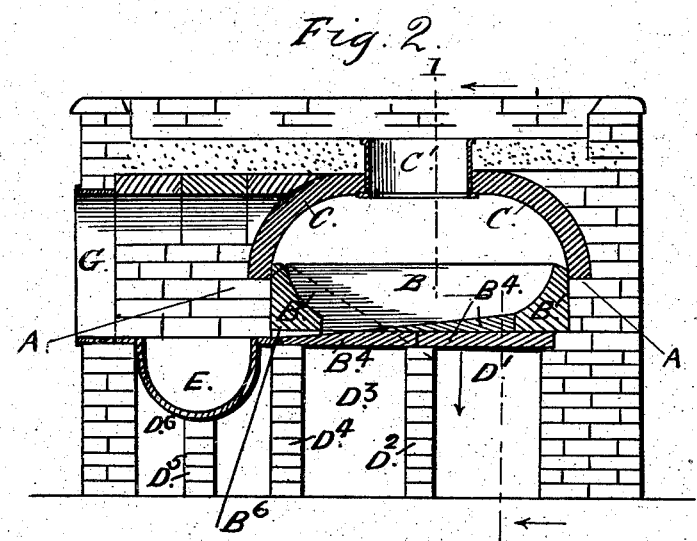

Figure 1 is a longitudinal sectional view of the combined furnace and treatment-chambers. Fig. 2 is a transverse section; Fig. 3, a diagrammatic plan view of the flue arrangement and hearth and secondary-pot setting as combined for the purposes. It is to be observed that the location of the oxid first-treatment basin is not specifically depicted in this view.

Within the furnace structure A and immediately behind the furnace-grate A', I build the basin or oxid-container B with fire-clay, using for the ends and sides the right-angled fire-clay blocks B', known as "seating-blocks," the curved sides of which form the inner side of the basin, and the interstices of the blocks at the corners of the basin are finished off and rounded with fire-clay.

In order to facilitate the passage of the flames over the oxid contained in the basin B, the upper edges at each end $B^2$ $B^3$ may be rounded; but those of the sides are to be left free. (See Fig. 2.)

The roof of the furnace is to be made of curvilinear blocks C, based on the side walls A (shown particularly in Fig. 2) of the brickwork free beyond the basin area, so that all repairs of the basin may be made without disturbing the sides and roof structure. Said blocks C meet over the center and form an arch of great strength and stability extending in depth from front to back of the furnace structure.

The superficial area of the oxid-basin is very great compared with the depth, so that the flames and gases passing over the front rounded edge $B^2$ of the basin are brought into contact with a large surface of the oxid and are compelled to traverse the whole extent of the basin in close proximity to the oxid under treatment, the same being kept stirred from time to time as required.

The fire-grate $A'$ and furnace opening and doors at $A^2$ are of normal type, the grate $A'$ being of short depth, but equal in breadth to the oxid-basin B. The discharge of the heat and gases after passing over the basin B extends along the whole width at rear $B^3$ of the basin and the back wall of the furnace structure, the area of discharge being sufficient to allow the flames and hot gases after passing over the oxid to descend by way of the flue-aperture D (see Fig. 3) and traverse the whole length of the flue $D'$, arranged to one side under the bottom of the oxid-basin and running forward toward the front of the furnace structure and thence past a baffle $D^2$ by way of $D^3$, past the baffle $D^4$, around and under the secondary pot or basin E, past the baffle $D^5$, to the egress $D^6$, to the discharge-shaft.

The direction of the flue to and under the pot E is designed to utilize to the utmost the process of conversion and preserving the temperature of the melted metal while the process is being completed. The flues are thus arranged to present the greatest surface of the bottom of the basin B, which is made as thin as is consistent with the necessary great strength. To this purpose I form the upper surface of the flue and bottom of the basin of strong fire-tiles $B^4$, supported by and with their edges meeting on strong fire-bumps $B^5$, resting on the furnace-walls and the baffles $D^2 D^4$. These bumps $B^5$ will form girders across the parts $D' D^3$ of the flue, so strengthening the bottom of the basin.

The whole structure will on all sides be finished in substantial brickwork and the top flushed in with concrete, a suitable manhole $C'$ being left for admitting the charge of oxid and flux.

On one side of the furnace a large opening G, suitably arched with similar curved blocks, as C, is provided, giving access to the oxid-basin B for examination, cleaning, and removal of waste products, and this opening G is to be furnished with a gas-tight door. A tapping-hole or draw-off duct (indicated at $B^6$, Fig. 2) is provided leading from the bottom of the basin B to serve for the running or tapping off of the melted metal when the proper fusion is effected. Within the gas-tight door of the opening G of the furnace is built in the cast-iron pot E, normally built with fire-clay at a suitable level, so that the molten metal from the draw-off duct $B^6$ may discharge itself or be discharged into the pot E as it is melted or from time to time as may be regulated. The location of this iron pot E affords the largest possible surface to the heated currents before they are conducted to the chimney.

Access is provided to the ash-pan and to the flues under the oxid-basin through an arched front H, the flue-walls being provided with ordinary flue-doors $H'$, whereby any deposits may be removed.

It may here be observed that the object of this invention is to convert oxids of the metals in large quantities to the suppression of crucible work. From one to five or more hundredweight of stuff can be treated at one charge. The whole treatment is carried out in continuous manner without access of air. A slag covering is formed in the first heating and is not disturbed.

I am aware of the Patent No. 4,936, dated March 15, A. D. 1884, granted in England to one John Hodgkins for "Furnaces for melting metals," and also of the Patent No. 681,354, dated August 27, A. D. 1901, granted in the United States to one S. M. Trapp for "Ore-reducing furnace," and I do not claim anything in the specifications contained upon which the said patents were granted; but

I claim—

In means for converting metallic oxids into metal, the combination of a smelting-hearth, a melting-pot, a connection between said hearth and said pot, and flues whereby the flame and products of combustion are led over the smelting-hearth and then under the same and then under said pot, the melted metal in said pot and said connection being kept out of direct contact with the flame and products of combustion, substantially as described.

In testimony whereof I have hereunto set my hand.

WM. W. FYFE.

Witnesses:
WALTER A. BARLOW,
W. HOWARD BARLOW.